United States Patent [19]

Young

[11] Patent Number: 5,597,345
[45] Date of Patent: Jan. 28, 1997

[54] APPARATUS FOR MAKING AN APERTURE IN A TILE

[76] Inventor: Michael J. R. Young, Bremridge Farm, Ashburton, South Devon, TQ13 7JX, England

[21] Appl. No.: 262,184

[22] Filed: Jun. 20, 1994

[30] Foreign Application Priority Data

Jun. 19, 1993 [GB] United Kingdom .................. 9312699

[51] Int. Cl.⁶ ................ B24B 7/00; B24B 9/00
[52] U.S. Cl. ............................. 451/165; 451/41
[58] Field of Search .............................. 451/165, 41, 56, 451/90

[56] References Cited

U.S. PATENT DOCUMENTS

| | | | |
|---|---|---|---|
| 2,680,333 | 6/1954 | Calosi | 451/165 |
| 2,774,193 | 12/1956 | Thatcher et al. | 451/165 |
| 3,619,671 | 11/1971 | Shoh | 451/165 |
| 4,100,701 | 7/1978 | Bessaguet | 451/320 |
| 4,343,111 | 8/1982 | Inoue | 451/165 |
| 5,101,599 | 4/1992 | Takabayasi et al. | 451/165 |
| 5,105,588 | 4/1992 | Verley et al. | 451/102 |
| 5,140,773 | 8/1992 | Miwa et al. | 451/165 |
| 5,177,902 | 1/1993 | Baba et al. | 451/165 |
| 5,195,410 | 3/1993 | Young . | |

FOREIGN PATENT DOCUMENTS

| | | | |
|---|---|---|---|
| 3919895 | 12/1990 | Germany | 451/165 |
| 250552 | 5/1969 | U.S.S.R. | 451/165 |
| 2203367 | 10/1988 | United Kingdom | 451/165 |

*Primary Examiner*—D. S. Meislin
*Assistant Examiner*—Derris H. Banks
*Attorney, Agent, or Firm*—Oblon, Spivak, McClelland, Maier & Neustadt, P.C.

[57] ABSTRACT

An apparatus producing an aperture through a workpiece of brittle material such as ceramic or glass which includes a piezo electric transducer to generate longitudinal vibrations at a frequency within the range 20–40 kHz, and transmit the vibrations to a tip adapted to contact the workpiece. Additionally a motor generates small amplitude movements of the tip at a frequency in the range of 10–100 Hz in a plane transverse to the direction of the longitudinal vibrations.

33 Claims, 3 Drawing Sheets

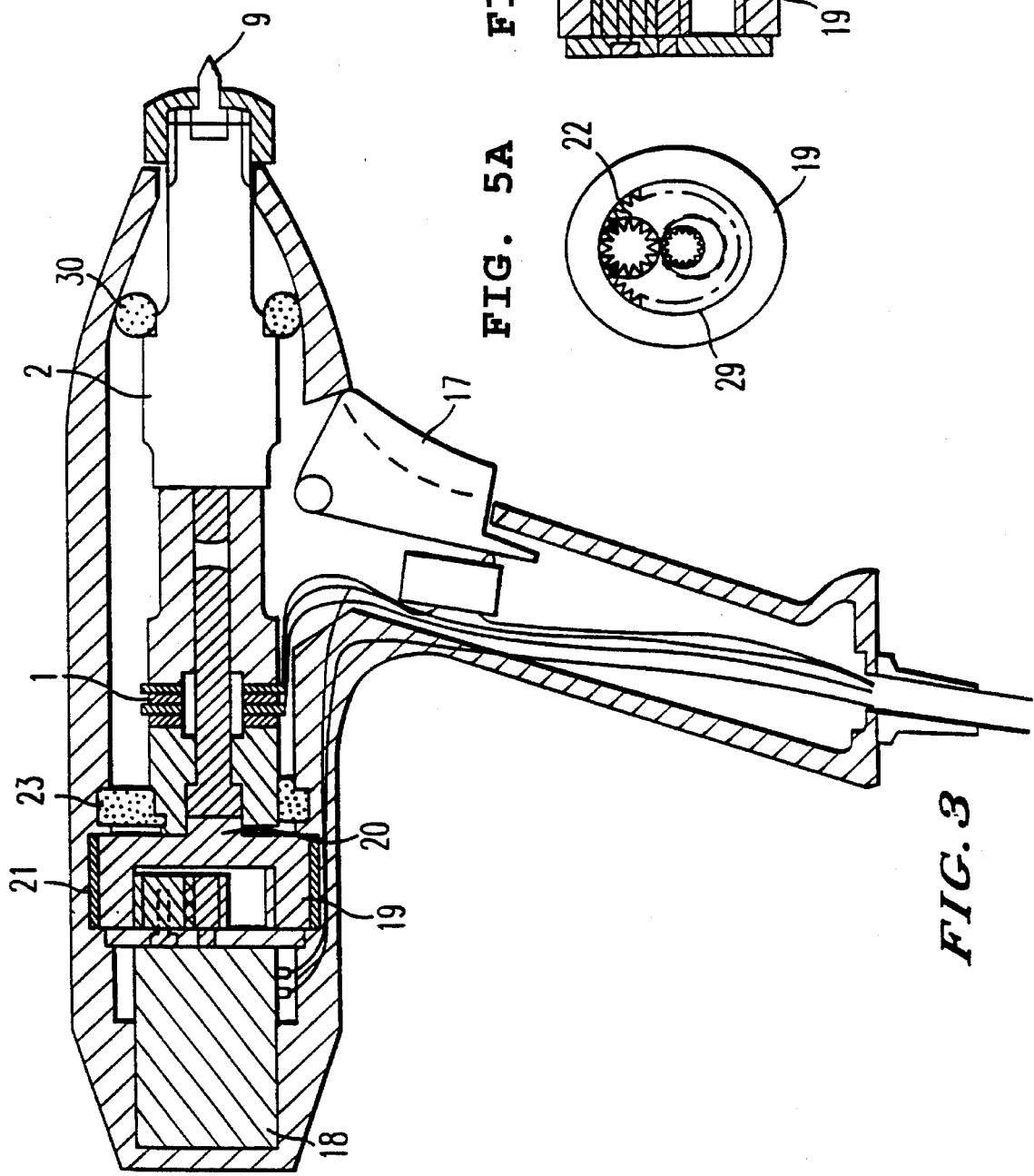

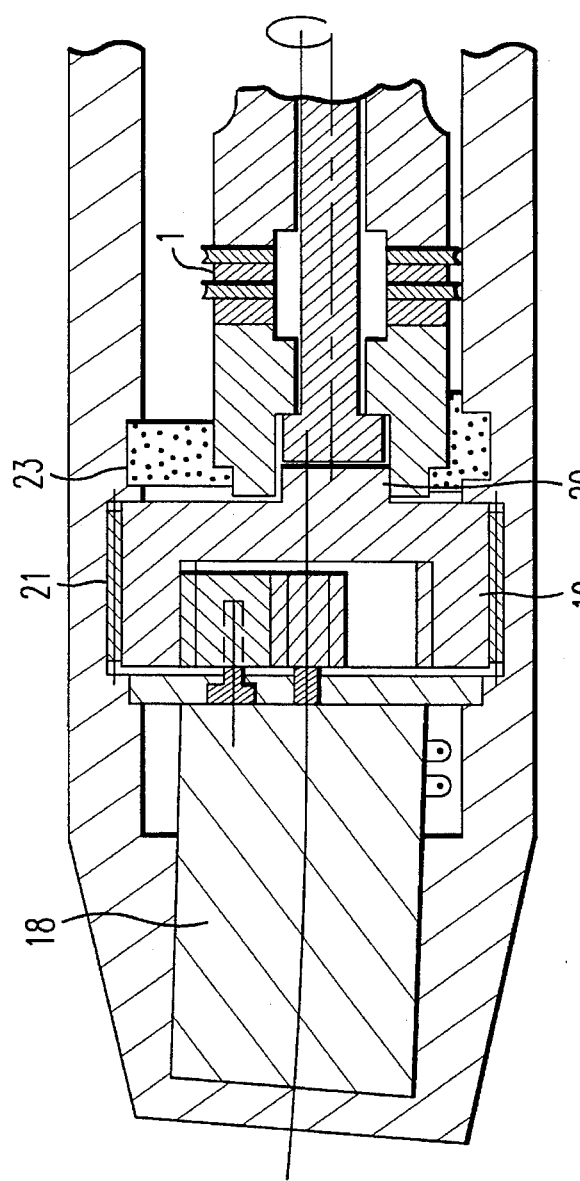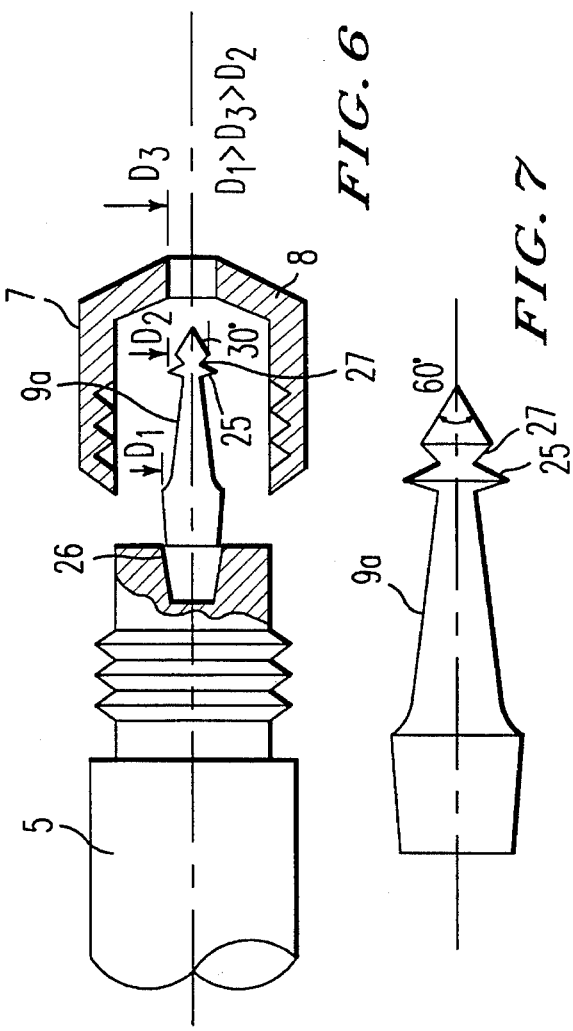

APPARATUS FOR MAKING AN APERTURE IN A TILE

BACKGROUND OF THE INVENTION

1. Field of the Invention

The present invention relates to a tool to produce an aperture through a tile of ceramic material or other workpiece of similar material. More particularly but not exclusively, it relates to a tool operated by piezoelectric transducer means to generate a cutting force in one direction and by a motor or other means to generate a force in a transverse direction.

2. Discussion of the Background

It is known to cut tiles or other brittle materials, henceforth referred to for convenience as tiles, which term includes glass and the like, by means of ultrasonic vibrations operating to produce repeated impacts of minimal amplitude on the surface to generate cracks within the tile or other material. As the tool is moved manually along the surface, a line of cracks is propagated and the tile will break in two.

However the method outlined above does not permit a hole to be cut in a tile. The method of crack propagation alone is not entirely applicable where it is desired not to split the tile, but to remove material from it, so as to form an aperture.

SUMMARY OF THE INVENTION

It is therefore an object of the present invention to provide an apparatus which enables an aperture to be made in a tile of ceramic material, as hereinabove defined. The apparatus may also be used to cut tiles.

According to a first aspect of the present invention, a tool to produce an aperture through a tile of ceramic material or other workpiece of similar material comprises a piezoelectric transducer means to generate longitudinal vibrations at a frequency within the range 20–40 kHz, a tip operatively couplable to said transducer and adapted to contact said workpiece, and means simultaneously to generate small amplitude movements of said tip at a frequency in the range of 10–100 Hz and in a plane transverse to the direction of the longitudinal vibrations.

The tip may be pointed at its furthermost longitudinal extreme and extend rearwardly thereof as a cone of an included angle of between 55°–65°, preferably in the region of 60°.

The tip may further include a connecting portion having a generally frustoconical shape, its narrowest end being integrally formed with the cone portion of said tip and having a diameter of between 0.25–0.5 of that of the base diameter of the cone portion, preferably 0.4–0.5.

The frustoconical portion of the tip may be provided with a flange extending radially around it and spaced rearwardly of the base portion of said tip.

The diameter of said flange may be in the region of twice the diameter of the base portion of said tip.

The tip connecting portion may be connected to the ultrasonic coupling horn by means of a tapered portion which is mated to fit within a correspondingly tapered recess in the end of said horn.

The angle of taper may be between 1 and 2 degrees, preferably 1.5 degrees.

Preferably the recess is lined with a layer of copper or similar malleable metal to improve coupling during subsequent use of the apparatus.

Ultrasonic vibrations of the tip in a longitudinal direction may have an amplitude in the region of 10–20 μm.

Transverse movements of the tip at lower frequency may have an amplitude of 0.5–1.5 mm. Where the tool is adapted to be manually operated, the amplitude of the translational movements may be increased under manual control.

The transverse movement generating means may comprise a motor, and a cam and cam follower arrangement or similar arrangement, whereby actuation of the motor causes intermittent transverse movements of the tip.

Preferably the motor arrangement is connected to the transducer at a rearward end thereof, and the transducer, horn and tip assembly is so pivotable at a substantially median point thereof that the tip moves transversely and oppositely in response to said intermittent transverse movements caused by the motor.

The transducer, horn and tip assembly may be held at said median point within a ring of elastomeric material acting as a pivot zone.

The transverse movements may be translational movements.

Actuation of the motor may be contemporaneous with actuation of the transducer.

Alternatively said actuation may be delayed or postponed at the discretion of the user.

The tip is preferably of tungsten carbide and may be detachable and have a planar rearward end surface.

According to a second aspect of the present invention, there is provided a tool to produce an aperture through a tile of ceramic material or other workpiece of similar material and comprising a piezoelectric transducer to generate a longitudinal vibration, a horn of aluminium alloy operatively connected thereto, a connecting piece of titanium alloy operatively connected to said horn at one end, and a tip of tungsten carbide or other hard material operatively connected to said connecting piece, each connected one to the next and of such configuration and length that a standing wave of one half wavelength or an operative multiple thereof is creatable between the tip and the transducer.

The connecting piece of titanium alloy may be connected to the horn of aluminium alloy by means of a screw thread and operatively connected thereto by means of a shoulder abutting against an end of the horn.

The connecting piece of titanium alloy may be connected to a tip holder by means of a second screw thread which is preferably coarser than the first mentioned screw thread.

The tip may have a shoulder to restrain it within the tip holder.

When the tip holder is screwed into place, the tip is held in operative contact with the connecting piece.

According to a third aspect of the present invention there is provided a tip for an ultrasonically powered ceramic drilling tool comprising a first conical portion having an included angle of between 55°–65°, preferably 60°, and a second shank portion operatively connectable to a source of ultrasonic vibrations and having a tapered cross section with a minimum diameter adjacent the first portion, said minimum diameter being 0.25–0.5, preferably 0.4–0.5, of that of the base diameter of said first portion.

Preferably the tip is of tungsten carbide.

According to a fourth aspect of the present invention there is provided a tool combining the features of any two or more of the above aspects.

BRIEF DESCRIPTION OF THE DRAWINGS

An embodiment of the invention will now be more particularly described by way of example and with reference to the accompanying drawings, in which:

FIG. 3 is an elevational view, partially in cross section, showing a tool which includes the elements of the above invention;

FIG. 5 is a schematic view of the motor and cam arrangement for causing transverse movements;

FIG. 6 is an elevational view, in cross section, of the tip of the apparatus, in a separated condition, according to another embodiment of the invention;

FIG. 7 is an elevational view of the tip of FIG. 6 in greater detail; and

FIG. 8 is a detailed cross sectional view of the motor cam and cam arrangement.

DESCRIPTION OF THE PREFERRED EMBODIMENTS

Figure 1:
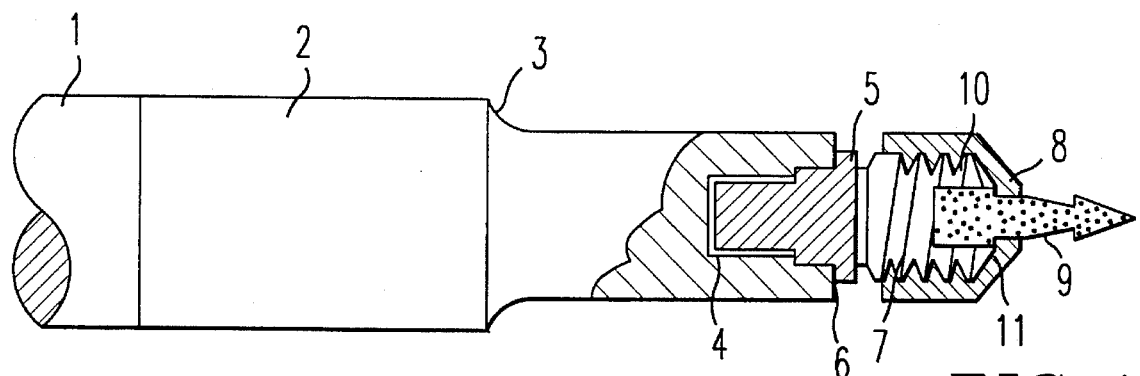
FIG. 1 is a schematic elevational view of the transducer, horn and tip, showing partially in cross section.

Referring now to the drawings, FIG. 1 shows an ultrasonic vibration system comprising a piezoelectric ceramic transducer 1, connected to an aluminium alloy horn 2, having a step 3. At its outermost end, the horn 2 is provided with an aperture 4 which has a fine screw thread. Into this is screwed a connecting piece 5 of titanium alloy which is operatively connected to the aluminium alloy horn 2 by virtue of shoulder 6. The outermost end of the connecting piece 5 has a coarse external screw thread 7 and an aperture 10 to receive and operatively connect with a tip 9 of hard and durable material such as tungsten carbide. The tip is retained in connection by means of a retaining sleeve 8 which may be screwed to the course thread of the connecting member 5, by means of a shoulder 11, formed integrally with the tip and adapted to retain it within the sleeve 8. The sleeve is also preferably of titanium alloy.

Figure 4:
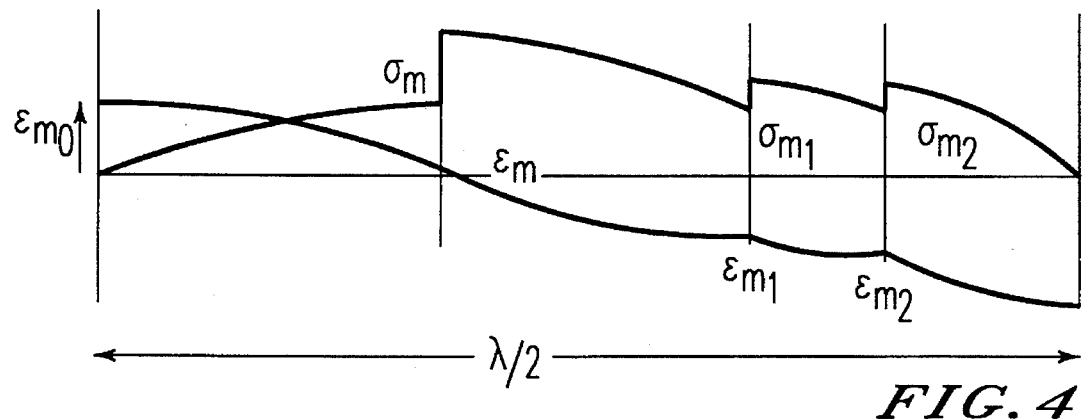
FIG. 4 is a graphical representation of the velocity and stress distributed across the transducer, horn and tip, indicating the standing wave amplitude.

As may be seen from FIG. 4, the distance between the piezo electric transducer 1 and the end of the tip 9 is one half of a wavelength. The level of stress, indicated by σ, increases sharply at each interface but is adapted to return substantially to its initial level at the point of the tip 9, so that there is substantially zero stress overall. The velocity $\epsilon_m$ reverses in phase over the half wavelength, in discontinuous sections depending on the material of that section, there is an increased gain overall.

Figure 2:
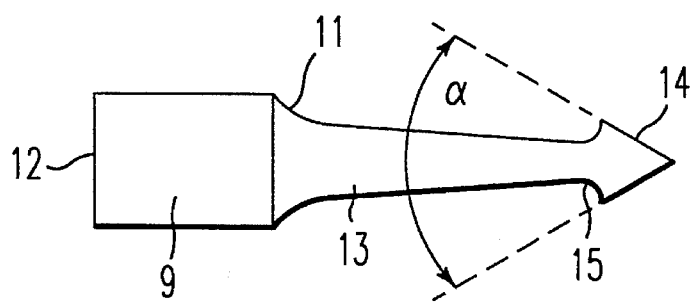
FIG. 2 is a more detailed elevational view of the tip.

Referring now to FIG. 2, tip 9, which is of tungsten carbide or other hard and durable material, is replaceable and is adapted to contact the titanium alloy connecting piece 5 by means of surface 12. It is held within the sleeve 8 by means of shoulder 11. Projecting beyond the shoulder 11 is a tapering portion 13 narrowing progressively towards end 15. At this point, it is connected to the base of a conical tip portion 14 which has an included angle α which is preferably between 55° and 60°. The diameter of the base of the cone is substantially equal to that of the aperture which it is desired to make in the title. The reduction in diameter immediately behind the base of the cone, i.e. at end 15, allows removal of the tile or ceramic material behind the conical tip. Different shapes are of course possible.

One alternative embodiment is shown in FIG. 7. The tip is provided with a radially extending flange 25, spaced behind the tip itself and having a diameter approximately twice that of the base of the tip itself. The flange is integrally formed of the material of the tip, preferably tungsten carbide, and its diameter corresponds substantially to an extension of the angle of the tip itself. As stated above, the preferred diameter is approximately twice that of the base of the tip, but this may be varied depending on its longitudinal separation from the base.

In operation, the tip will initiate cracking of the tile. The purpose of the flange 25 is to aid cutting and removal of deritus. Given the larger diameter of the flange, the amplitude of longitudinal displacement at its periphery is commensurately large, and this extra longitudinal displacement side removal from the crack of material fractured by the primary action of the tip.

A further feature of a further embodiment is shown in FIGS. 6 and 7 the tip of this embodiment referred to herein as 9a, has an inwardly tapered portion 27, at an angle of approximately 1.50.

Correspondingly, the recess into which the tapered end of the tip fits may be tapered. The recess is preferably lined with a malleable metal, such as copper, which after a period of use will deform to provide an intimate burnished coupling surface between the tip and the horn. The lining may take the form of a copper washer or there may be an electroplated coating.

Referring now to FIG. 3, there is shown a tool in the form of a manually graspable article having a power feed 16 and a trigger 17. The article is a molding of two parts into which the piezoelectric ceramic transducer 1 and its associated horn 2 fit.

At the rear end, i.e. the end most remote from the tip 9, of the transducer there is arranged a motor 18 having a fairly low speed of rotation. The motor drives an orbiting gear wheel 19, rotatable within a bearing 21. An integral eccentric cam 29 rotates with the gear 19 around the axis of the motor. The cam engages in a rear socket of transducer thus generating rotation of the transducer axis about the motor axis and by virtue of the pivotal resilient mounting 30 substantially coincident with the nodal plane of the coupling horn 2, creates a corresponding orbital displacement of the tip 9.

Alternatively, referring to FIG. 5, gear 19 may include an internally mounted cam 29 which rotates with said gear around the axis of the motor. Regularly, either once (or where there are two cams 29, twice) per revolution, the cam strikes a cam follower 22 which is attached to the rear of the piezo electric ceramic transducer 1.

The rear end of the transducer 1 is cushioned by a bushing of elastomeric material such as rubber 23 but there is a transverse movement at the rear of the transducer 1 every revolution (or half revolution) of the motor 18.

The transducer is held by a rubber bushing 30 at said nodal plane, and the transverse movement at the rear end causes the transducer to pivot around this zone and therefore the tip 9 moves oppositely to the rear end of the transducer.

The apparatus preferably operates with the tip being actuated to move longitudinally by 10–20 μm (peak to peak), at a frequency in the region of 20–40 khz (preferably 30 khz). The transverse movement of the tip is designed to have an amplitude of between 0.5 and 1.5 mm (peak to peak) and the frequency of movement is between 10 and 100 Hz. However, other frequencies or amplitudes may be advisable.

The coupling horn 2 is preferably of an alloy of aluminium with 4% copper, which gives low loss characteristics but has an economic cost. It is also strong enough to accept the threaded connecting piece 5 at its outward end. It is preferred that the connecting piece 5 is of titanium alloy since this is more resistant to fatigue, although it is more expensive than aluminium alloy. One advantage of the aluminium coupling horn is the high gain which can be achieved, as is shown in FIG. 4.

With regard to the tip 9, the preferred included angle of the cone is 60° and there should be a portion of reduced diameter behind the cone to relieve the tip shank from contacting the workpiece during cutting. The preferred ratio of diameter at the rear of the cone is between 0.25 and 0.5 or 0.4 and 0.5. In other words, the reduction diameter at this point should be sufficiently great to allow operation of the device within an aperture but should also retain strength at this point.

The trigger 17 may comprise two elements, one for the transducer 1, and one for the motor 18, so that they may be operated together, simultaneously or according to a desired sequence or only one may be actuated.

Obviously, numerous modifications and variations of the present invention are possible in light of the above teachings. It is therefore to be understood that within the scope of the appended claims, the invention may be practiced otherwise than as specifically described herein.

What I claim is:

1. A tip for an ultrasonically powered ceramic cutting tool comprising a first conical portion having an included angle of between 55°–65°, and a second shank portion operatively connectable to a source of ultrasonic vibration and having a tapered cross section with a minimum diameter being 0.25–0.5 of that of the base diameter of said first portion.

2. A tip as claimed in claim 1, wherein the included angle is 60°.

3. A tip according to claim 1, wherein the minimum diameter is 0.4–0.5 of that of the base diameter of the said first portion.

4. A tip according to claim 1, wherein the tip is of tungsten carbide.

5. A tip according to claim 1, wherein said shank portion includes a flange portion extending radially therefrom and spaced from said conical portion.

6. A tip according to claim 5, wherein the diameter of the flange is substantially equal to a projection of the included angle of the conical portion.

7. A tip according to claim 5, wherein the diameter of the flange is twice that of the diameter of a base of the conical portion.

8. A method of producing an aperture in a workpiece of brittle material, said method comprising the steps of providing an apparatus, comprising a piezoelectric transducer generating longitudinal vibrations at a frequency within the range of 20–40 kHz and a tip operatively coupled to said transducer and contacting said workpiece generating a small amplitude movement of said tip at a frequency in the range of 10–100 Hz and in a plane transverse to the direction of the longitudinal vibrations, said transverse movements being generated by a motor, a cam and a cam follower arrangement such that actuation of the motor causes intermittent transverse movement of the tip, applying the tip thereof to the material, and removing the material.

9. A method as claimed in claim 8, wherein applying the tip to material includes manually moving.

10. An apparatus producing an aperture through a workpiece of brittle material, comprising piezoelectric transducer means for generating longitudinal vibrations at a frequency within the range 20–40 kHz, a tip operatively coupled to said transducer and contacting said workpiece, and actuation means comprising a motor, a cam and a cam follower arrangement, wherein actuation of the motor generates intermittent transverse movements of the tip at a frequency in the range of 10–100 Hz in a plane transverse to the direction of the longitudinal vibrations.

11. An apparatus according to claim 10, wherein the motor, cam and cam follower arrangement is connected to the transducer at a rearward end thereof, and wherein an assembly including the transducer and tip is pivotable at a substantially median point thereof such that the tip moves transversely and oppositely in response to said intermittent transverse movement generated by the motor.

12. An apparatus according to claim 10, wherein said assembly is held at said median point within a ring of elastomeric material acting as a pivot zone.

13. An apparatus according to claim 10, wherein the actuation means is connected to the transducer at a rearward end thereof such that actuation of the motor causes intermittent transverse movement of the tip, and wherein a ring of elastomeric material is provided to act as a pivot zone, said ring being located at a median point of an assembly of the transducer, horn and tip.

14. An apparatus according to claim 13, wherein the tip comprises tungsten carbide.

15. An apparatus according to claim 10, wherein the transverse movement comprises translational movement.

16. An apparatus according to claim 15, wherein actuation of the motor is contemporaneous with actuation of the transducer.

17. An apparatus according to claim 15, wherein actuation of the motor is delayable at the discretion of a user operating the motor.

18. An apparatus producing an aperture through a workpiece of brittle material, said apparatus comprising:

a piezoelectric transducer generating longitudinal vibrations;

a horn of aluminum alloy operatively connected to said transducer, a connecting piece of titanium alloy connected to said horn by a first screw thread and operatively connected thereto by a shoulder abutting against an end of the horn, and a tip of tungsten carbide operatively connected to said connecting piece, such that one of a standing wave of one half wavelength and an operative multiple thereof is generated between the tip and the transducer.

19. An apparatus according to claim 18, which comprises a tip holder holding said tip, wherein the connecting piece of titanium alloy is connected to said tip holder by means of a second screw thread.

20. A method of producing an aperture in a workpiece of brittle material, comprising:

producing a micro crack in said material by applying, directly to the surface of the workpiece at a point on the periphery of the aperture to be produced, a pointed end of a tool, applying high frequency vibrations in a longitudinal direction to the tool, applying vibrations in a direction transverse to said longitudinal direction to said tool, and moving said tool along said periphery to propagate micro cracks in said workpiece along the length of the periphery.

21. The method of claim 20, further comprising applying a substantially steady, longitudinally directed pressure from the tool to the workpiece until said micro crack occurs, and moving said tool along said periphery to propagate further micro cracks.

22. The method according to claim 20, wherein the longitudinally directed vibrations are at a frequency within a range of 20–40 kHz.

23. The method according to claim 20, wherein the transversely directed vibrations are at a frequency in a range of 10–100 Hz.

24. An apparatus producing an aperture through a workpiece of brittle material, comprising:

a piezoelectric transducer generating longitudinal vibrations at a frequency within the range of 20–40 kHz, a tip operatively coupled to said transducer and contacting said workpiece, and an actuation mechanism comprising a motor, a cam and a cam follower arrangement wherein actuation of the motor generates intermittent transverse movements of the tip at a frequency in the range of 10–100 Hz in a plane transverse to the direction of the longitudinal vibrations.

25. An apparatus according to claim 24, wherein the motor, cam and cam follower arrangement is connected to the transducer at a rearward end thereof, and wherein an assembly including the transducer and tip is pivotable at a substantially median point thereof such that the tip moves transversely and oppositely in response to said intermittent transverse movement generated by the motor.

26. An apparatus according to claim 24, wherein said assembly is held at said median point within a ring of elastomeric material acting as a pivot zone.

27. An apparatus according to claim 24, wherein the actuation mechanism is connected to the transducer at a rearward end thereof such that actuation of the motor causes intermittent transverse movement of the tip and wherein a ring of elastomeric material is provided to act as a pivot zone, said ring being located at a median point of an assembly of the transducer, horn and tip.

28. An apparatus according to claim 27, wherein the tip comprises tungsten carbide.

29. An apparatus according to claim 24, wherein the transverse movement comprises translational movement.

30. An apparatus according to claim 29, wherein actuation of the motor is contemporaneous with actuation of the transducer.

31. An apparatus according to claim 29, wherein actuation of the motor is delayable at the discretion of the user operating the motor.

32. An apparatus producing an aperture through a workpiece of brittle material, said apparatus comprising:

a piezoelectric transducer generating longitudinal vibrations;

a horn of aluminum alloy operatively connected to said transducer;

a connecting piece of titanium alloy connected to said horn by a first screw thread and operatively connected thereto by a shoulder abutting against an end on the horn; and a tip of tungsten carbide operatively connected to said connecting piece, such that one of a standing wave of one half wavelength and an operable multiple thereof is generated between the tip and the transducer.

33. An apparatus according to claim 32, which comprises a tip holder holding said tip, wherein the connecting piece of titanium alloy is connected to said tip holder by a second screw thread.

* * * * *